(12) United States Patent
Tsujimoto et al.

(10) Patent No.: US 8,051,647 B2
(45) Date of Patent: Nov. 8, 2011

(54) EXHAUST PURIFICATION DEVICE OF INTERNAL COMBUSTION ENGINE

(75) Inventors: Kenichi Tsujimoto, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 12/226,522

(22) PCT Filed: Feb. 18, 2008

(86) PCT No.: PCT/JP2008/053116
§ 371 (c)(1),
(2), (4) Date: Oct. 21, 2008

(87) PCT Pub. No.: WO2008/102895
PCT Pub. Date: Aug. 28, 2008

(65) Prior Publication Data
US 2009/0151331 A1 Jun. 18, 2009

(30) Foreign Application Priority Data
Feb. 23, 2007 (JP) ................. 2007-043316

(51) Int. Cl.
*F01N 3/00* (2006.01)
(52) U.S. Cl. ......... 60/297; 60/286; 60/287; 60/295; 60/301; 60/303
(58) Field of Classification Search ............ 60/274, 60/280, 286, 287, 288, 295, 297, 301, 303, 60/311
See application file for complete search history.

(56) References Cited

U.S. PATENT DOCUMENTS

| 5,473,890 | A | 12/1995 | Takeshima et al. | |
|---|---|---|---|---|
| 6,119,450 | A | 9/2000 | Boegner et al. | |
| 6,293,094 | B1 * | 9/2001 | Schmidt et al. | 60/284 |
| 6,348,177 | B1 | 2/2002 | Bartley et al. | |
| 6,502,391 | B1 * | 1/2003 | Hirota et al. | 60/288 |
| 7,117,667 | B2 * | 10/2006 | Mital et al. | 60/286 |
| 7,165,394 | B2 * | 1/2007 | Toshioka et al. | 60/295 |
| 7,181,904 | B2 * | 2/2007 | Yoshida et al. | 60/285 |
| 7,249,455 | B2 * | 7/2007 | Tumati et al. | 60/287 |
| 7,784,276 | B2 * | 8/2010 | Ono | 60/301 |

(Continued)

FOREIGN PATENT DOCUMENTS

FR 2 819 549 A1 7/2002

(Continued)

OTHER PUBLICATIONS

Extended European Search Report issued in European Application No. EP 08 71 18808, dated Mar. 2, 2011.

*Primary Examiner* — Binh Q Tran
(74) *Attorney, Agent, or Firm* — Oliff & Berridge, PLC (57) ABSTRACT

An internal combustion engine in which a main SOx trap catalyst able to trap SOx contained in exhaust gas is arranged in an engine exhaust passage, and the exhaust passage downstream of the main SOx trap catalyst is divided into a main exhaust passage and a bypass passage bypassing the main exhaust passage. An NOx storage catalyst is arranged in the main exhaust passage, and an auxiliary SOx trap catalyst is arranged in the main exhaust passage upstream of the NOx storage catalyst. Normally, the exhaust gas is made to flow in the main exhaust passage. When regenerating the main SOx trap catalyst, the exhaust gas is made to flow through the bypass passage.

7 Claims, 7 Drawing Sheets

U.S. PATENT DOCUMENTS

| | | |
|---|---|---|
| 2004/0037755 A1 | 2/2004 | Mital et al. |
| 2005/0178110 A1 | 8/2005 | Mital et al. |
| 2006/0064969 A1 | 3/2006 | Yoshida et al. |

FOREIGN PATENT DOCUMENTS

| | | |
|---|---|---|
| JP | A 6-346768 | 12/1994 |
| JP | A 11-280456 | 10/1999 |
| JP | A 2000-145436 | 5/2000 |
| JP | A 2000-179327 | 6/2000 |
| JP | A 2000-297631 | 10/2000 |
| JP | A 2005-133610 | 5/2005 |
| WO | WO 03/031780 A1 | 4/2003 |

* cited by examiner

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storage catalyst storing $NO_x$ contained in exhaust gas when the air-fuel ratio of the inflowing exhaust gas is lean and releasing the stored $NO_x$ when the air-fuel ratio of the inflowing exhaust gas becomes a stoichiometric air-fuel ratio or rich. In this internal combustion engine, $NO_x$ formed when burning fuel under a lean air-fuel ratio is stored in the $NO_x$ storage catalyst. On the other hand, as the $NO_x$ storage catalyst approaches saturation of the $NO_x$ storage ability, the air-fuel ratio of the exhaust gas is temporarily made rich, whereby $NO_x$ is released from the $NO_x$ storage catalyst and reduced.

However, fuel and lubrication oil contain sulfur. Therefore, the exhaust gas also contains $SO_x$. This $SO_x$ is stored together with the $NO_x$ in the $NO_x$ storage catalyst. This $SO_x$ is not released from the $NO_x$ storage catalyst by just making the exhaust gas a rich air-fuel ratio. Therefore, the amount of $SO_x$ stored in the $NO_x$ storage catalyst gradually increases. As a result, the storable $NO_x$ amount ends up gradually decreasing.

Therefore, known in the art is an internal combustion engine preventing $SO_x$ from being fed into the $NO_x$ storage catalyst by providing an $SO_x$ absorbent in the engine exhaust passage upstream of the $NO_x$ storage catalyst (see Japanese Patent Publication (A) No. 2000-179327). In this internal combustion engine, the $SO_x$ contained in the exhaust gas is absorbed by the $SO_x$ absorbent, therefore the $SO_x$ is prevented from flowing into the $NO_x$ storage catalyst. As a result, it is possible to prevent the storage of $SO_x$ from causing a drop in the storage ability of the $NO_x$.

However, when using such an $SO_x$ absorbent, if the $SO_x$ absorbent ends up being saturated in $SO_x$ absorption ability, the $SO_x$ ends up flowing into the $NO_x$ storage catalyst. However, in this $SO_x$ absorbent, if raising the $SO_x$ absorbent in temperature and making the exhaust gas flowing into the $SO_x$ absorbent a rich air-fuel ratio, it is possible to make the $SO_x$ absorbent release the absorbed $SO_x$ and therefore possible to regenerate the $SO_x$ absorbent. However, if making the $SO_x$ absorbent release the $SO_x$ in this way, the released $SO_x$ ends up being stored in the $NO_x$ storage catalyst. Therefore, in this internal combustion engine, a bypass passage bypassing the $NO_x$ storage catalyst is provided and, when making the $SO_x$ absorbent release $SO_x$, the released $SO_x$ is exhausted through the bypass passage into the atmosphere.

However, even if exhausting the $SO_x$ released from the $SO_x$ absorbent through the bypass passage into the atmosphere at the time of regeneration of the $SO_x$ absorbent in this way, in actuality part of the $SO_x$ leaks and ends up flowing into the $NO_x$ storage catalyst. As a result, there is a problem that the amount of $SO_x$ stored in the $NO_x$ storage catalyst gradually increases.

DISCLOSURE OF THE INVENTION

An object of the present invention is to provide an exhaust purification device of an internal combustion engine able to prevent the inflow of $SO_x$ to the $NO_x$ storage catalyst.

According to the present invention, there is provided an exhaust purification device of an internal combustion engine arranging in an engine exhaust passage a main $SO_x$ trap catalyst able to trap $SO_x$ contained in an exhaust gas, dividing the exhaust passage downstream of the main $SO_x$ trap catalyst into a main exhaust passage and a bypass passage bypassing the main exhaust passage, arranging in the main exhaust passage an $NO_x$ storage catalyst storage $NO_x$ contained in the exhaust gas when an air-fuel ratio of an inflowing exhaust gas is lean and releasing stored $NO_x$ when the air-fuel ratio of the inflowing exhaust gas becomes a stoichiometric air-fuel ratio or rich, arranging in the main exhaust passage upstream of the $NO_x$ storage catalyst an auxiliary $SO_x$ trap catalyst, the exhaust gas is usually made to flow through the main exhaust passage, and the exhaust gas is made to flow through the bypass passage when the main $SO_x$ trap catalyst should be regenerated.

In the present invention, when making the exhaust gas flow through the bypass passage to regenerate the $SO_x$ trap catalyst, even if the $SO_x$ released from the main $SO_x$ trap catalyst leaks into the main exhaust passage, this leaked $SO_x$ is trapped by the auxiliary trap catalyst and therefore $SO_x$ can be prevented from flowing into the $NO_x$ storage catalyst.

BEST MODE FOR CARRYING OUT THE INVENTION

Figure 1:
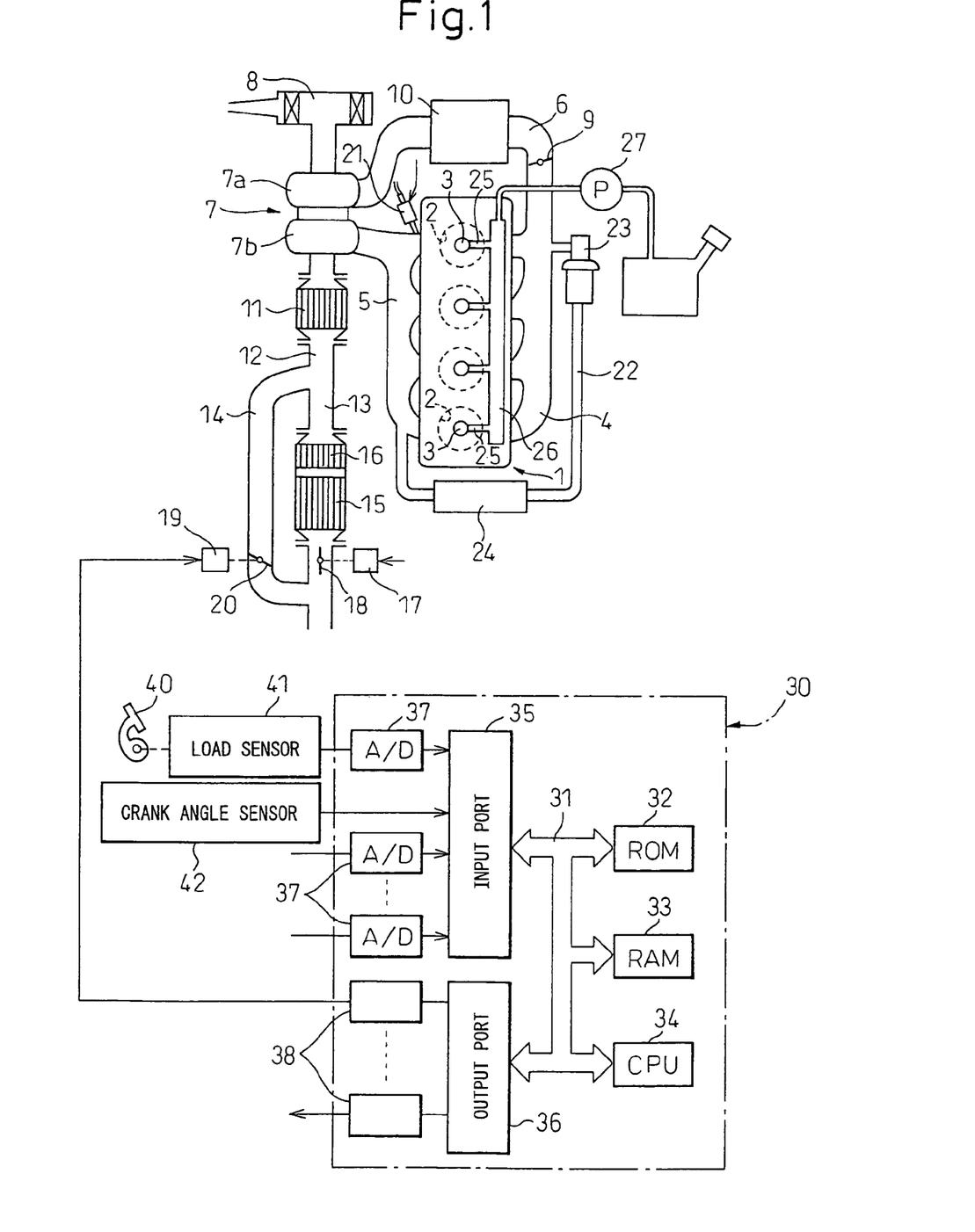
FIG. 1 is an overview of a compression ignition type internal combustion engine.

FIG. 1 is an overview of a compression ignition type internal combustion engine.

Referring to FIG. 1, 1 indicates an engine body, 2 a combustion chamber of each cylinder, 3 an electronically controlled fuel injector injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected to an air cleaner 8. Inside the intake duct 6, a throttle valve 9 driven by the step motor is arranged. Further, around the intake duct 6, a cooling device 10 for cooling the intake air flowing through the intake duct 6 is arranged. In the embodiment shown in FIG. 1, the engine cooling water is led into the cooling device 10 where the engine cooling water is used to cool the intake air.

On the other hand, the exhaust manifold 5 is connected to the inlet of an exhaust turbine 7b of the exhaust turbocharger 7 and the outlet of the exhaust turbine 7b is connected to the inlet of a main $SO_x$ trap catalyst 11.

An exhaust pipe 12 is connected to the outlet of the main $SO_x$ trap catalyst 11, and an exhaust passage formed in the exhaust pipe 12 is branched into a main exhaust passage 13 and a bypass passage 14 bypassing the main exhaust passage 13. An $NO_x$ storage catalyst 15 is arranged in the main exhaust passage 13, and an auxiliary $SO_x$ trap catalyst 16 is arranged in the main exhaust passage 13 upstream of the $NO_x$ storage catalyst 15.

As shown in FIG. 1, a first exhaust control valve 18 which is opened or closed by an actuator 17 is arranged in the main exhaust passage 13 downstream of the $NO_x$ storage catalyst 15, and a second exhaust control valve 20 which is opened or closed by an actuator 19 is arranged in the bypass passage 14. As shown in FIG. 1, normally, the first exhaust control valve 18 is fully open, and the second exhaust control valve 20 is completely closed. Accordingly, normally, the exhaust gas flows within the main exhaust passage 13. On the other hand, a reducing agent feed valve 21 for feeding a reducing agent comprised of for example a hydrocarbon into the exhaust gas flowing within the exhaust manifold is attached to the exhaust manifold 5.

The exhaust manifold 5 and intake manifold 4 are connected to each other through an exhaust gas recirculation (hereinafter referred to as "EGR") passage 22. Inside the EGR passage 22, an electronic control type EGR control valve 23 is arranged. Further, around the EGR passage 22, a cooling device 24 for cooling the EGR gas flowing through the EGR passage 22 is arranged. In the embodiment shown in FIG. 1, engine cooling water is led to the cooling device 24 where the engine cooling water cools the EGR gas. On the other hand, each fuel injector 3 is connected through a fuel tube 25 to a common rail 26. This common rail 26 is fed with fuel from an electronically controlled variable discharge fuel pump 27. The fuel fed into the common rail 26 is fed through each fuel tube 25 into the fuel injectors 3.

The electronic control unit 30 is comprised of a digital computer and is provided with a ROM (read only memory) 32, RAM (random access memory) 33, CPU (microprocessor) 34, input port 35, and output port 36 which are connected to each other by a bi-directional bus 31. As shown in FIG. 1, the accelerator pedal 40 is connected to a load sensor 41 generating an output voltage proportional to the amount of depression L of an accelerator pedal 40. The output voltage of the load sensor 40 is input through a corresponding AD converter 37 to the input port 35. Further, the input port 35 is connected to a crank angle sensor 42 generating an output pulse each time the crankshaft rotates by for example 15°. On the other hand, the output port 36 is connected through a corresponding drive circuit 38 to the fuel injectors 3, the step motor for driving the throttle valve 9, the actuators 17, 19 for actuating the first exhaust control valve 18 and the second exhaust control valve 20, respectively, the reducing agent feed valve 21, EGR control valve 23 and the fuel pump 27.

Figure 2:
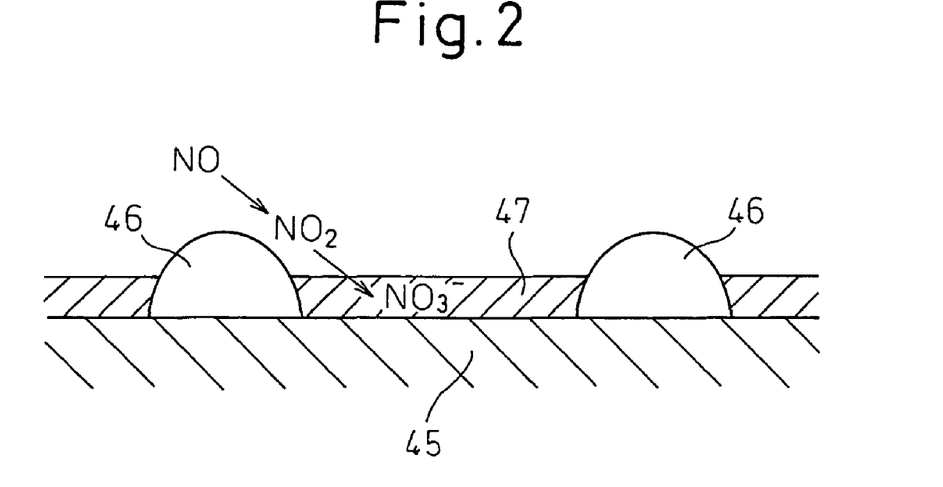
FIG. 2 is a cross-sectional view of a surface part of a catalyst carrier of an $NO_x$ storage catalyst.

Initially, the $NO_x$ storage catalyst 15 shown in FIG. 1 will be explained. This $NO_x$ storage catalyst 15 is comprised of a substrate on which for example a catalyst carrier comprised of alumina is carried. FIG. 2 illustrates the cross-section of the surface part of this catalyst carrier 45. As shown in FIG. 2, the catalyst carrier 45 carries a precious metal catalyst 46 diffused on the surface. Further, the catalyst carrier 45 is formed with a layer of an $NO_x$ absorbent 47 on its surface.

In the embodiment according to the present invention, as the precious metal catalyst 46, platinum Pt is used. As the ingredient forming the $NO_x$ absorbent 47, for example, at least one element selected from potassium K, sodium Na, cesium Cs, and other such alkali metals, barium Ba, calcium Ca, and other such alkali earths, lanthanum La, yttrium Y, and other rare earths is used.

If the ratio of the air and fuel (hydrocarbons) fed into the engine intake passage, combustion chamber 2, and exhaust passage upstream of the $NO_x$ storage catalyst 15 is called the "air-fuel ratio of the exhaust gas", an $NO_x$ absorption and release action such that the $NO_x$ absorbent 47 absorbs the $NO_x$ when the air-fuel ratio of the exhaust gas is lean and releases the absorbed $NO_x$ when the oxygen concentration in the exhaust gas falls is performed.

That is, explaining this taking as an example the case of using barium Ba as the ingredient forming the $NO_x$ absorbent 47, when the air-fuel ratio of the exhaust gas is lean, that is, the oxygen concentration in the exhaust gas is high, the NO contained in the exhaust gas, as shown in FIG. 2, is oxidized on the platinum Pt 46 to become $NO_2$, next is absorbed in the $NO_x$ absorbent 47 and bonds with the barium oxide BaO to diffuse in the form of nitrate ions $NO_3^-$ into the $NO_x$ absorbent 47. In this way, $NO_x$ is absorbed in the $NO_x$ absorbent 47. So long as the oxygen concentration in the exhaust gas is high, $NO_2$ is formed on the platinum Pt 46. So long as the $NO_x$ absorbent 47 is not saturated in $NO_x$ absorption ability, $NO_2$ is absorbed in the $NO_x$ absorbent 47 and nitrate ions $NO_3^-$ are formed.

As opposed to this, for example if the reducing agent feed valve 21 feeds the reducing agent to make the exhaust gas a rich air-fuel ratio or stoichiometric air-fuel ratio, the oxygen concentration in the exhaust gas falls, so the reaction proceeds in the reverse direction ($NO_3^- \rightarrow NO_2$), therefore the nitrate ions $NO_3^-$ in the $NO_x$ absorbent 47 are released in the form of $NO_2$ from the $NO_x$ absorbent 47. Next, the released $NO_x$ is reduced by the unburned HC and CO contained in the exhaust gas.

In this way, when the air-fuel ratio of the exhaust gas is lean, that is, when burning the fuel under a lean air-fuel ratio, the $NO_x$ in the exhaust gas is absorbed in the $NO_x$ absorbent 47. However, when the fuel continues to be burned under a lean air-fuel ratio, the $NO_x$ absorbent 47 eventually ends up becoming saturated in $NO_x$ absorption ability, therefore the $NO_x$ absorbent 47 ends up becoming unable to absorb the $NO_x$. Therefore, in this embodiment of the present invention, before the $NO_x$ absorbent 47 becomes saturated in absorption ability, the reducing agent is fed from the reducing agent feed valve 21 to make the exhaust gas temporarily rich air-fuel ratio and thereby make the $NO_x$ absorbent 47 release the $NO_x$.

Figure 4:
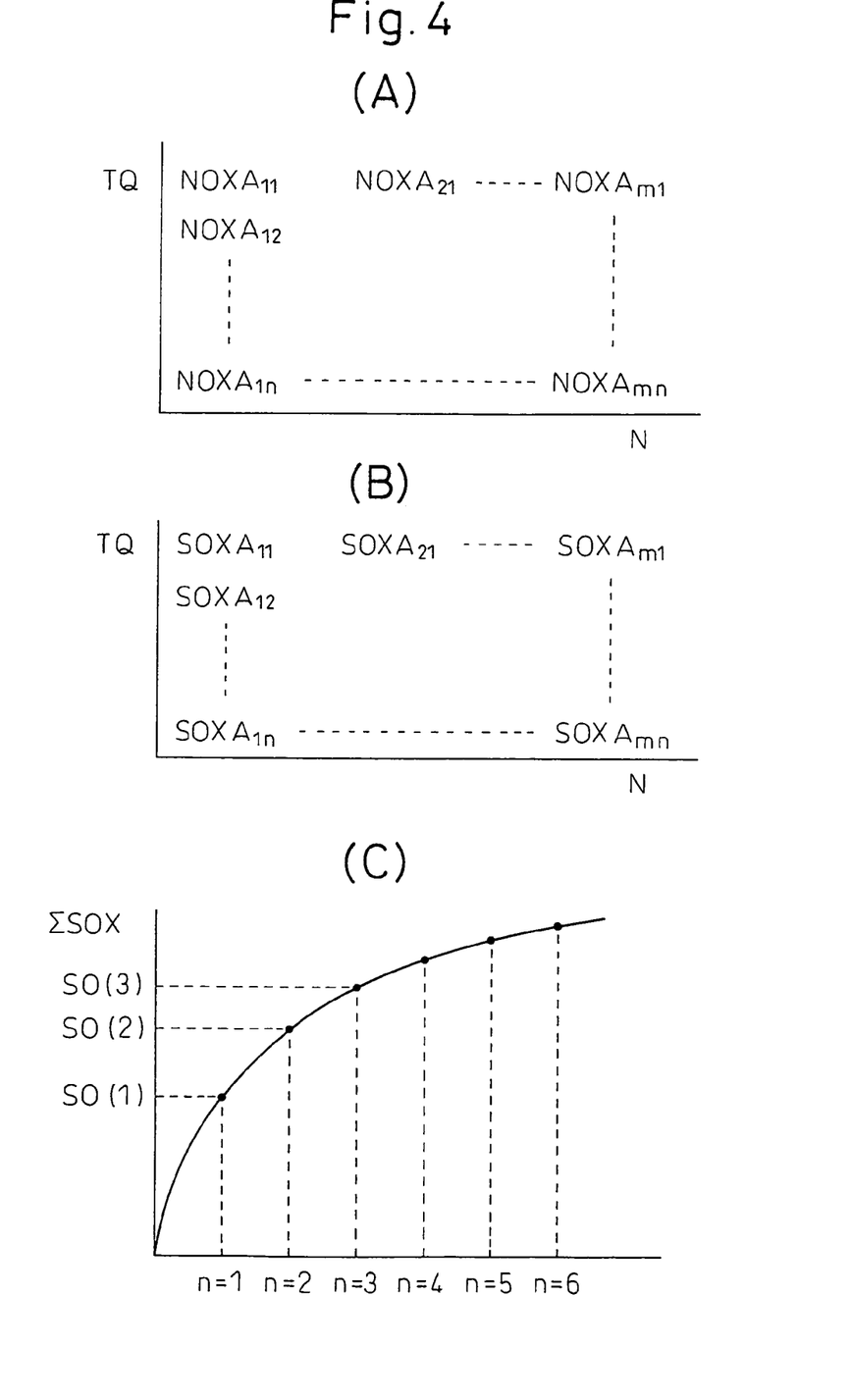
FIG. 4 is a view showing the relationship between a stored $SO_x$ amount $\Sigma SOX$ and a stored $SO_x$ amount $SO(n)$ for control of temperature elevation.
Figure 5:
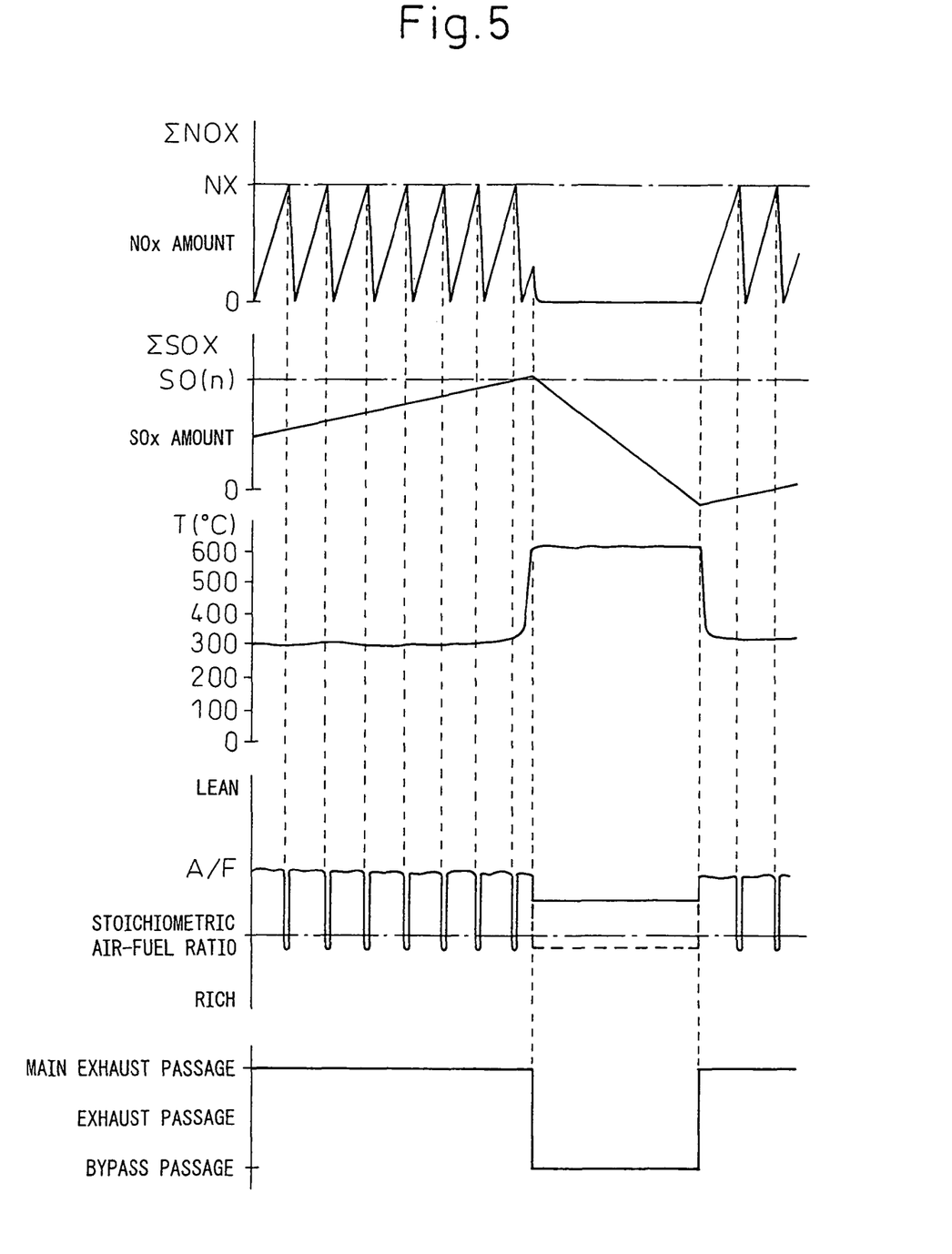
FIG. 5 is a time chart showing the changes in the stored $SO_x$ amount $\Sigma SOX$ etc.

Specifically speaking, in the embodiment according to the present invention, the $NO_x$ amount NOXA stored per unit time in the $NO_x$ storage catalyst 15 is stored as a function of the required torque TQ and engine speed N in the form of a map shown in FIG. 4(A), and the $NO_x$ amount $\Sigma NOX$ stored in the $NO_x$ storage catalyst 15 is calculated by cumulatively adding this $NO_x$ amount NOXA. In the embodiment according to the present invention, as shown in FIG. 5, every time the $NO_x$ amount $\Sigma NOX$ reaches an allowable valve NX, the air-fuel ratio A/F of the exhaust gas flowing into the $NO_x$ storage catalyst 15 is temporarily made rich and thereby the $NO_x$ is released from the $NO_x$ storage catalyst 15.

On the other hand, the exhaust gas contains $SO_x$, that is, $SO_2$. If this $SO_2$ flows into the $NO_x$ storage catalyst 15, this $SO_2$ is oxidized on the platinum Pt 46 and becomes $SO_3$. Next, this $SO_3$ is absorbed in the $NO_x$ absorbent 47, bonds with the barium oxide BaO, is diffused in the form of sulfate ions $SO_4^{2-}$ in the $NO_x$ absorbent 47, and forms stable sulfate $BaSO_4$. However, the $NO_x$ absorbent 47 has a strong basicity, so this sulfate $BaSO_4$ is stable and hard to break down. If just making the exhaust gas rich air-fuel ratio, the sulfate $BaSO_4$ remains as is without breaking down. Therefore, in the $NO_x$ absorbent 47, the sulfate $BaSO_4$ increases along with the elapse of time, therefore the $NO_x$ amount which the $NO_x$ absorbent 47 can absorb falls along with the elapse of time.

Therefore, in an embodiment of the present invention, the main $SO_x$ trap catalyst 11 is arranged upstream of the $NO_x$ storage catalyst 15 to trap the $SO_x$ contained in the exhaust gas by this main $SO_x$ trap catalyst 11 and thereby prevent $SO_x$ from flowing into the $NO_x$ storage catalyst 15. Next this main $SO_x$ trap catalyst 11 will be explained.

This main $SO_x$ trap catalyst 11 is comprised of for example a monolithic catalyst having a honeycomb construction and has a plurality of exhaust gas flow passages extending straight in the axial direction of the main $SO_x$ trap catalyst 11.

Figure 3:
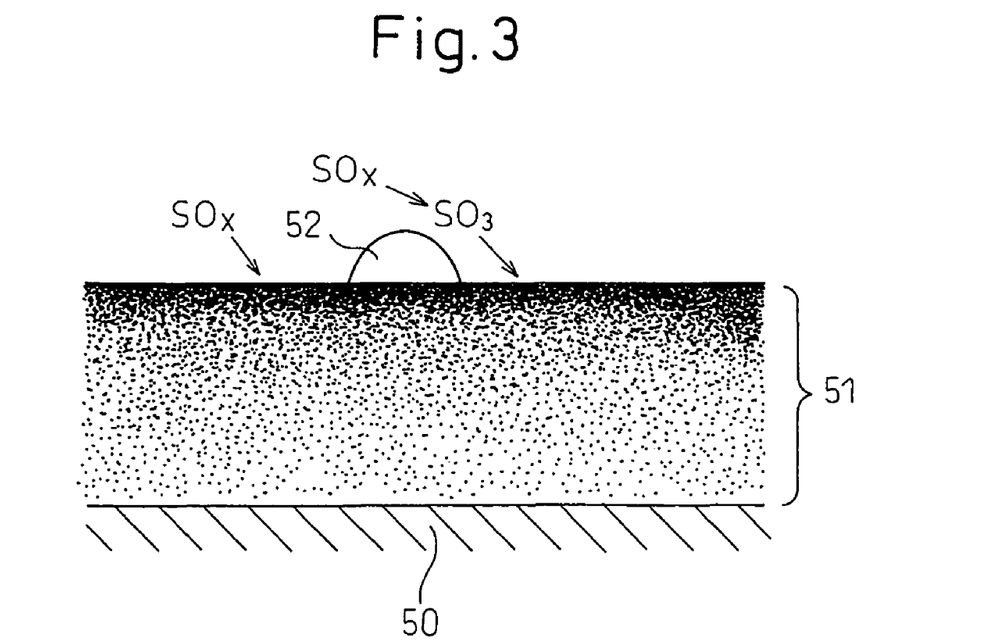
FIG. 3 is a cross-sectional view of a surface part of a substrate of an $SO_x$ trap catalyst.

FIG. 3 illustrates the cross-section of the surface part of a substrate 50 of this main $SO_x$ trap catalyst 11. As shown in FIG. 3, the substrate 50 is formed with a coat layer 51 on its surface. This coat layer 51 carries a precious metal catalyst 52 diffused on its surface.

In the embodiment according to the present invention, as the precious metal catalyst 52, platinum is used. As the ingredient forming the coat layer 51, for example, at least one element selected from potassium K, sodium Na, cesium Cs, and other such alkali metals, barium Ba, calcium Ca, and other such alkali earths, lanthanum La, yttrium Y, and other rare earths is used. That is, the coat layer 51 of the main $SO_x$ trap catalyst 11 exhibits a strong basicity.

Now, the $SO_x$ contained in the exhaust gas, that is, $SO_2$, is oxidized on the platinum Pt 52 as shown in FIG. 3, then is trapped in the coat layer 51. That is, the $SO_2$ diffuses in the form of sulfate ions $SO_4^{2-}$ in the coat layer 51 to form a sulfate. Note that as explained above, the coat layer 51 exhibits a strong basicity. Therefore, as shown in FIG. 3, part of the $SO_2$ contained in the exhaust gas is directly trapped in the coat layer 51.

In FIG. 3, the shading in the coat layer 51 shows the concentration of the trapped $SO_x$. As will be understood from FIG. 3, the $SO_x$ concentration in the coat layer 51 is highest near the surface of the coat layer 51. The further in, the lower it becomes. If the $SO_x$ concentration near the surface of the coat layer 51 increases, the surface of the coat layer 66 weakens in basicity and the $SO_x$ trap ability weakens. Here, if the ratio of the amount of the $SO_x$ trapped in the main $SO_x$ trap catalyst 11 to the amount of the $SO_x$ in the exhaust gas is called the "$SO_x$ trap rate", if the basicity of the surface of the coat layer 51 is weakened, the $SO_x$ trap rate falls along with that. In the embodiment according to the present invention, when the $SO_x$ trap rate falls below a predetermined rate, a temperature raising control for raising the temperature of the main $SO_x$ trap catalyst 11 under a lean or rich exhaust gas air-fuel ratio is performed and thereby the $SO_x$ trap rate is restored.

Namely, if raising the temperature of the main $SO_x$ trap catalyst 11 when the air-fuel ratio of the exhaust gas is lean, the $SO_x$ present concentrated near the surface of the coat layer 51 diffuses toward the deep part of the coat layer 51 so that the concentration becomes uniform. That is, the nitrates formed in the coat layer 51 change from an unstable state where they concentrate near the surface of the coat layer 51 to the stable state where they are diffused evenly across the entire inside of the coat layer 51. If the $SO_x$ present near the surface of the coat layer 51 diffuses toward the deep part of the coat layer 51, the $SO_x$ concentration near the surface of the coat layer 51 falls. Therefore, when the temperature raising control of the main $SO_x$ trap catalyst 11 has ended, the $SO_x$ trap rate is restored.

If making the temperature of the main $SO_x$ trap catalyst 11 about 450° C. when performing the temperature raising control of the main $SO_x$ trap catalyst 11, it is possible to make the SOX present near the surface of the coat layer 51 diffuse in the coat layer 51. If raising the temperature of the main $SO_x$ trap catalyst 51 to 600° C. or so, the $SO_x$ concentration in the coat layer 51 can be made considerably even. Therefore, at the time of temperature raising control of the main $SO_x$ trap catalyst 11, it is preferable to raise the temperature of the main $SO_x$ trap catalyst 11 to 600° C. or so under a lean air-fuel ratio of the exhaust gas.

Next, an embodiment of the temperature raising control of the main $SO_x$ trap catalyst 11 will be specifically explained.

In this embodiment, the $SO_x$ amount trapped by the main $SO_x$ trap catalyst 11 is estimated. When the $SO_x$ amount trapped by the main $SO_x$ trap catalyst 11 exceeds a predetermined amount, it is judged that the $SO_x$ trap rate has fallen below the predetermined rate. At this time, to restore the $SO_x$ trap rate, the temperature raising control of raising the temperature of the main $SO_x$ trap catalyst 11 under a lean air-fuel ratio of the exhaust gas is performed.

That is, fuel contains sulfur in a certain ratio. Therefore, the amount of $SO_x$ contained in the exhaust gas, that is, the amount of $SO_x$ trapped by the main $SO_x$ trap catalyst 11, is proportional to the amount of fuel injection. The amount of fuel injection is a function of the required torque and engine speed. Therefore, the amount of $SO_x$ trapped by the main $SO_x$ trap catalyst 11 becomes a function of the required torque and engine speed. In this embodiment according to the present invention, the $SO_x$ amount SOXA trapped per unit time in the main $SO_x$ trap catalyst 11 is stored as a function of the required torque TQ and engine speed N in the form of a map shown in FIG. 4(B) in advance in the ROM 32.

Further, in this embodiment, as shown in FIG. 4(C), the relationship of the $SO_x$ amount ΣSOX and the predetermined $SO_x$ amount SO(n) when the main $SO_x$ trap catalyst 11 should be raised in temperature is stored in advance. When the $SO_x$ amount ΣSOX exceeds a predetermined SO(n) (n=1, 2, 3, . . . ), the temperature raising treatment is performed to raise the temperature of the main $SO_x$ trap catalyst 11. Note that in FIG. 4(C), n indicates what number time the temperature raising treatment is. As will be understood from FIG. 4(C), as the number of times n of temperature raising treatment for restoring the $SO_x$ trap rate increases, the predetermined amount SO(n) is increased. The rate of increase of this predetermined amount SO(n) is reduced the greater the number of times n of treatment. That is, the rate of increase of SO(3) with respect to SO(2) is reduced from the rate of increase of SO(2) with respect to SO(1).

That is, as shown in FIG. 5, in this embodiment, when the $SO_x$ amount ΣSOX reaches SO(n), the temperature T of the main $SO_x$ trap catalyst 11 is raised to 600° C. or so and is maintained at 600° C. or so under a lean air-fuel ratio of the exhaust gas. Note that in this embodiment, at the time of temperature raising control, hydrocarbons if fed from the hydrocarbon supply valve 21 and the temperature of the main $SO_x$ trap catalyst 11 is raised by the heat of oxidation reaction of the hydrocarbons.

On the other hand, if making the exhaust gas a rich air-fuel ratio when raising the temperature of the main $SO_x$ trap catalyst 11 in this way, the main $SO_x$ trap catalyst 11 ends up releasing $SO_x$. Therefore, in this embodiment, at the time of temperature raising control, the exhaust gas is maintained at a lean air-fuel ratio. However, when the $SO_x$ concentration near the surface of the coat layer 51 becomes high, even if the exhaust gas is maintained at a lean air-fuel ratio, the main $SO_x$ trap catalyst 11 ends up releasing $SO_x$ when the main $SO_x$ trap catalyst 11 is raised in temperature. Therefore, at this time, to prevent the $SO_x$ from flowing into the $NO_x$ storage catalyst 15, the first exhaust control valve 18 is closed and the second exhaust control valve 20 is opened. That is, as shown in FIG. 5, at the time of the temperature raising control of the main $SO_x$ trap catalyst 11, the exhaust passage is switched from the main exhaust passage 13 to the bypass passage 14.

However, even if the first exhaust control valve 18 is closed, the exhaust gas actually passes around the first exhaust control valve 18 and leaks out. Therefore, even if the first exhaust control valve 18 is closed and the second exhaust control valve 20 is opened, while a small amount, exhaust gas flows into the main exhaust passage 13, therefore the $SO_x$ exhausted from the main $SO_x$ trap catalyst 11 flows into the $NO_x$ storage catalyst 15.

Therefore, in the present invention, to prevent the $SO_x$ from flowing into the $NO_x$ storage catalyst 15, as shown in FIG. 1, an auxiliary $SO_x$ trap catalyst 16 is arranged inside the main exhaust passage 13 upstream of the $NO_x$ storage catalyst 15. This auxiliary $SO_x$ trap catalyst 16 has a structure similar to the main $SO_x$ trap catalyst 11. In this auxiliary $SO_x$ trap catalyst 16, as shown in FIG. 3, a coat layer 51 is formed on the surface of the catalyst carrier 50. A precious metal catalyst 52 is carried and dispersed on the surface of this coat layer 51.

Furthermore, even with this auxiliary $SO_x$ trap catalyst 16, platinum is used as the precious metal catalyst 52, and, as the ingredient forming the coat layer 51, at least one element selected from for example potassium K, sodium Na, cesium Cs, or another such alkali metal, barium Ba, calcium Ca, or another such alkali earth, lanthanum La, yttrium Y, or another such rare earth is used.

Note that this auxiliary $SO_x$ trap catalyst 16 is never regenerated like the main $SO_x$ trap catalyst 11. This auxiliary $SO_x$ trap catalyst 16 is made to perform an $SO_x$ trapping action permanently. Therefore, in this embodiment according to the present invention, the basicity of the coat layer 51 of the auxiliary $SO_x$ trap catalyst 16 is made stronger than the basicity of the coat layer 51 of the main $SO_x$ trap catalyst 11. Therefore, the auxiliary $SO_x$ trap catalyst 16 is made higher in $SO_x$ holding capacity compared with the main $SO_x$ trap catalyst 11.

Next, an exhaust purification control routine will be explained with reference to FIG. 6.

Figure 6:
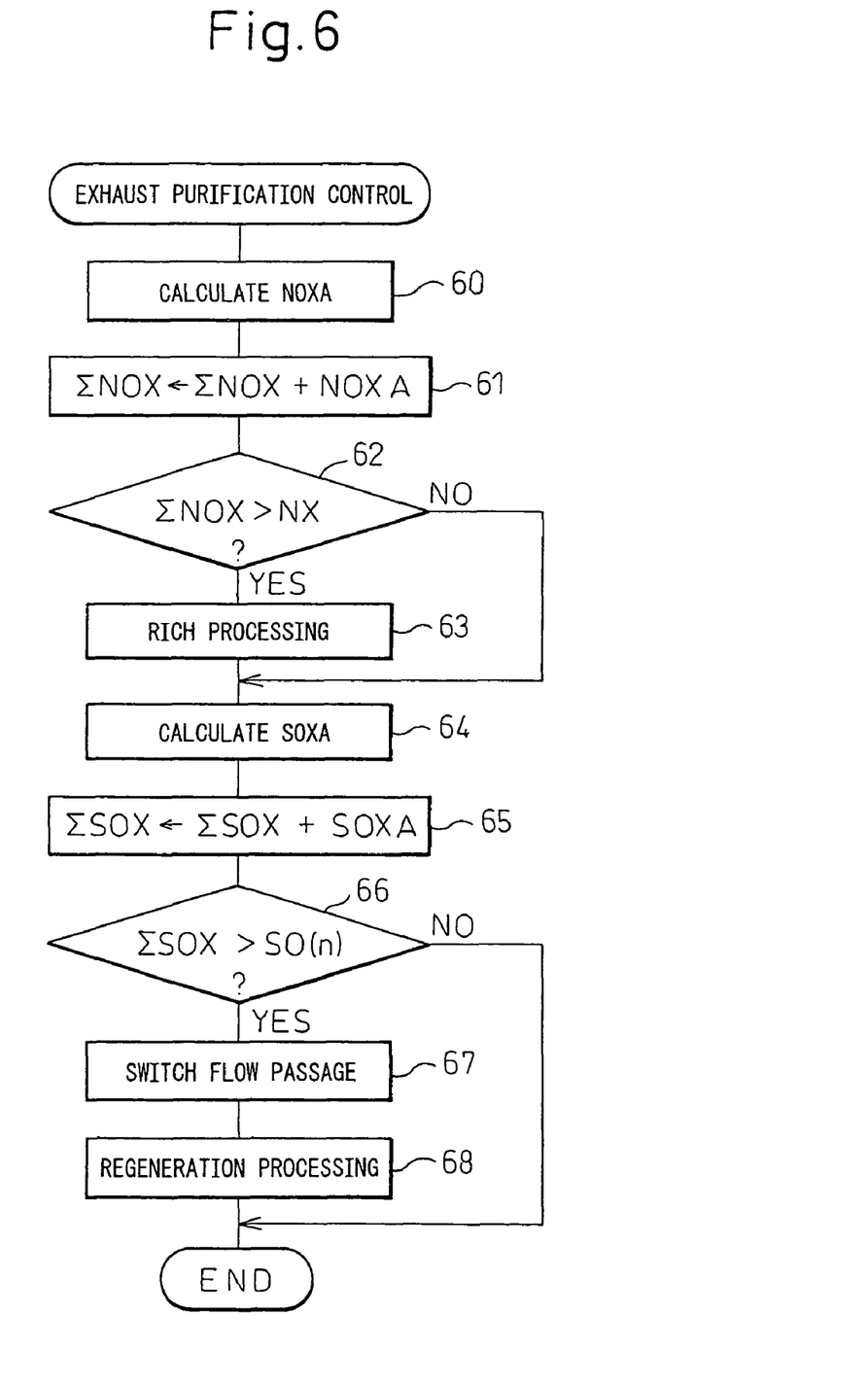
FIG. 6 is a flow chart for exhaust purification control.

Referring to FIG. 6, first, at step 60, the $NO_x$ amount NOXA stored in the $NO_x$ storage catalyst 15 per unit time is calculated from the map shown in FIG. 4(A). Next, at step 61, this NOXA is added to the $NO_x$ amount $\Sigma NOX$ stored in the NOX storage catalyst 15. Next, at step 62, it is judged whether the stored $NO_x$ amount $\Sigma NOX$ exceeds the allowable value NX. When $\Sigma NOX > NX$, the routine proceeds to step 63 where the rich processing of switching the air-fuel ratio of the exhaust gas flowing into the $NO_x$ storage catalyst 15 temporarily from lean to rich by the reducing agent supplied from the reducing agent supply valve 21 is performed and the $\Sigma NOX$ is cleared.

At this time, as shown in FIG. 1, the first exhaust control valve 18 is opened, and the second exhaust control valve 20 is closed. That is, the exhaust gas flows through the main exhaust passage 13. Further, as will be understood from FIG. 5, at this time, the main $SO_x$ trap catalyst 11 is not raised in temperature, so usually $SO_x$ is never exhausted from the main $SO_x$ trap catalyst 11, but if at this time the main $SO_x$ trap catalyst 11 were to release $SO_x$, this $SO_x$ would be trapped in the auxiliary $SO_x$ trap catalyst 11. Therefore, at the time of $NO_x$ release control, the $SO_x$ never flows into the $NO_x$ storage catalyst 15.

Next, at step 64, the $SO_x$ amount SOXA stored in the main $SO_x$ trap catalyst 11 per unit time is calculated from the map shown in FIG. 4(B). Next, at step 65, this SOXA is added to the $SO_x$ amount $\Sigma SOX$ trapped by the main $SO_x$ trap catalyst 11. Next, at step 66, it is judged if the $SO_x$ amount $\Sigma EOX$ reaches the predetermined amount SO(n) (n=1, 2, 3, ...) shown in FIG. 4(C). When the $SO_x$ amount $\Sigma SOX$ reaches the predetermined amount SO(n), the routine proceeds to step 67 where, as shown in FIG. 5, the exhaust passage is switched from the main exhaust passage 13 to the bypass passage 14. Next, at step 68, the regeneration control such that the temperature of the main $SO_x$ trap catalyst 11 is maintained at 600° C. or so under a lean air-fuel ratio of the exhaust gas is performed. When the regeneration treatment ends, the $\Sigma SOX$ is clear, and the exhaust passage is again switched to the main exhaust passage 13.

Further, when regenerating the main $SO_x$ trap catalyst 11, it is also possible to make the exhaust gas a rich air-fuel ratio as shown by the broken line in FIG. 5. At this time, as explained above, the main $SO_x$ trap catalyst 11 releases a large amount of $SO_x$. This released large amount of $SO_x$ is fed into the bypass passage 14. At this time as well, when $SO_x$ flows into the main exhaust passage 13, this inflowing $SO_x$ is trapped at the auxiliary $SO_x$ trap catalyst 16.

Figure 7:
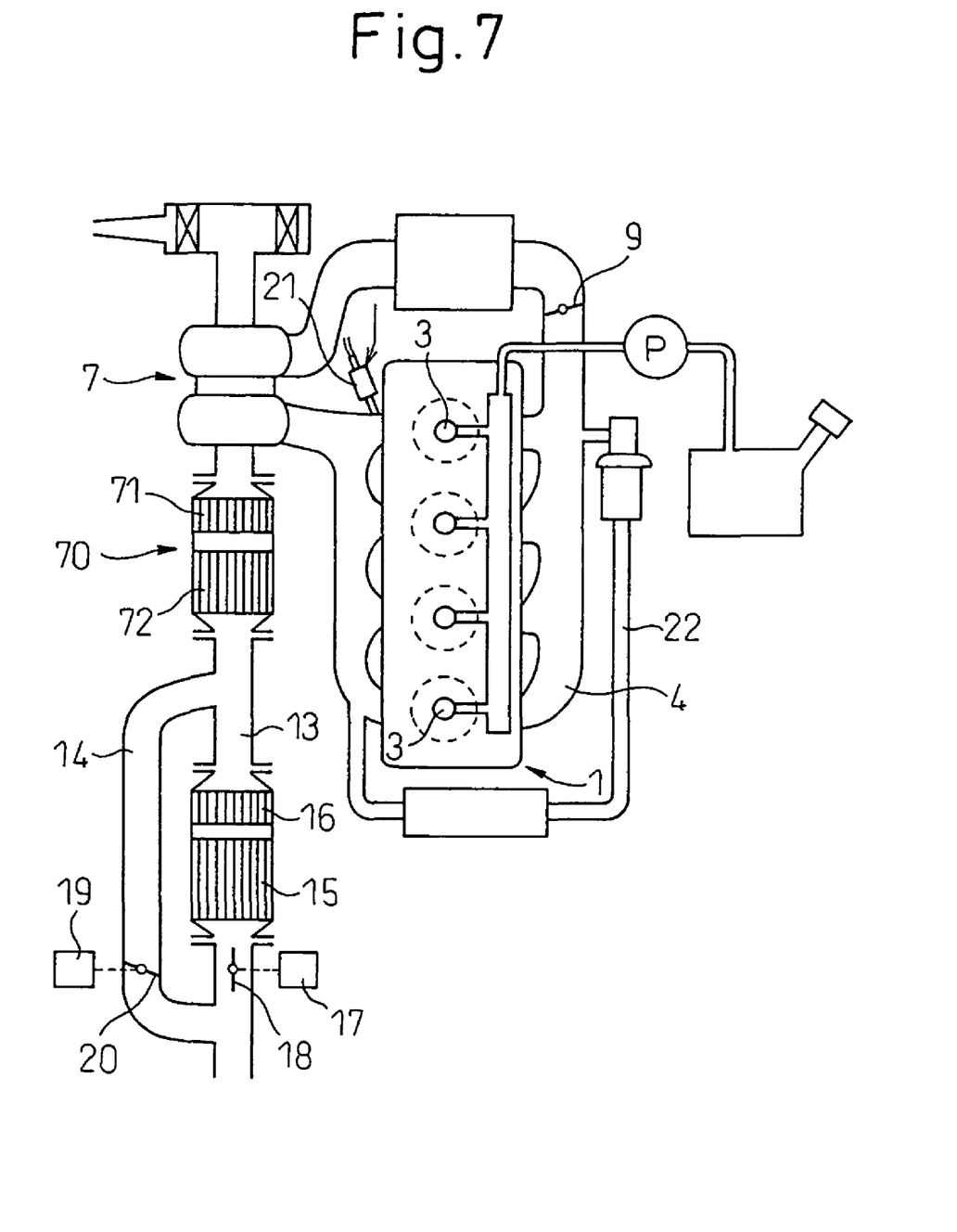
FIG. 7 is an overview of another embodiment of a compression ignition type internal combustion engine.

FIG. 7 shows another embodiment of a compression ignition type internal combustion engine. In this embodiment, the main $SO_x$ trap catalyst 70 is comprised of a serially arranged $SO_x$ trap catalyst 71 and particulate filter 72. In this embodiment, when the particulate filter 72 is raised in temperature under a lean air-fuel ratio of the exhaust gas so as to regenerate the particulate filter 72, the $SO_x$ trap catalyst 71 is also regenerated. Note that the $NO_x$ storage catalyst can also be carried on the particulate filter 72.

Figure 8:
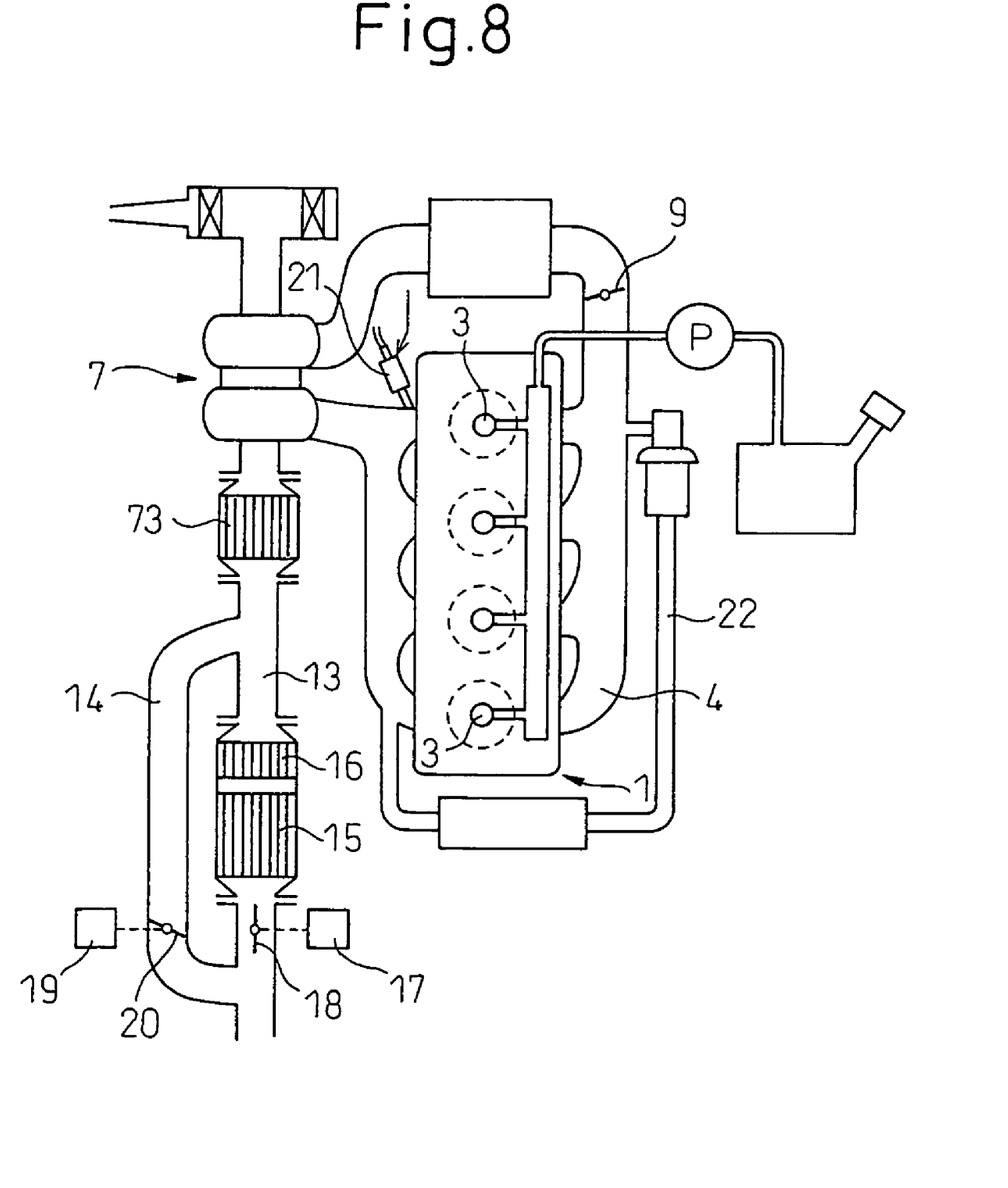
FIG. 8 is an overview of still another embodiment of a compression ignition type internal combustion engine.

FIG. 8 shows still another embodiment of a compression ignition type internal combustion engine. In this embodiment, the main $SO_x$ trap catalyst 73 is comprised of an $NO_x$ storage catalyst. When regenerating this $NO_x$ storage catalyst 73, the temperature of the $NO_x$ storage catalyst 73 is raised up to 600° C. or more and the exhaust gas flowing into the $NO_x$ storage catalyst 73 is made a rich air-fuel ratio. At this time, $SO_x$ is released from the $NO_x$ storing catalyst 73.

The invention claimed is:

1. An exhaust purification device of an internal combustion engine comprising:

a main $SO_x$ trap catalyst arranged in an engine exhaust passage, for trapping $SO_x$ contained in an exhaust gas, dividing the exhaust passage downstream of the main $SO_x$ trap catalyst into a main exhaust passage and a bypass passage bypassing the main exhaust passage;

an $NO_x$ storage catalyst arranged in the main exhaust passage for storing $NO_x$ contained in the exhaust gas when an air-fuel ratio of an inflowing exhaust gas is lean and releasing stored $NO_x$ when the air-fuel ratio of the inflowing exhaust gas becomes a stoichiometric air-fuel ratio or rich; and an auxiliary $SO_x$ trap catalyst arranged in the main exhaust passage upstream of the $NO_x$ storage catalyst, the exhaust gas is made to flow through the main exhaust passage, and the exhaust gas is made to flow through the bypass passage when the main $SO_x$ trap catalyst is regenerated, wherein the main $SO_x$ trap catalyst has a property that when the main $SO_x$ trap catalyst rises in temperature under a lean air-fuel ratio of the exhaust gas, the trapped $SO_x$ gradually diffuses inside the main $NO_x$ trap catalyst and has a property that when the air-fuel ratio of the exhaust gas flowing into the main $SO_x$ trap catalyst becomes rich, if the temperature of the main $SO_x$ trap catalyst is higher an $SO_x$ release temperature, the trapped $SO_x$ is released, and when the $SO_x$ trap rate by the main $SO_x$ trap catalyst falls below a predetermined rate, a regeneration action of the main $SO_x$ trap catalyst is performed.

2. An exhaust purification device of an internal combustion engine as set forth in claim 1, wherein the auxiliary $SO_x$ trap catalyst has a higher $SO_x$ holding ability than the main $SO_x$ trap catalyst.

3. An exhaust purification device of an internal combustion engine as set forth in claim 1, wherein the auxiliary $SO_x$ trap catalyst comprises a coat layer formed on a substrate and a precious metal catalyst held on the coat layer and the coat layer has an alkali metal, alkali earth metal, or rare earth metal dispersed in the coat layer.

4. An exhaust purification device of an internal combustion engine as set forth in claim 1, wherein when regenerating the main $SO_x$ trap catalyst, the main $SO_x$ trap catalyst is raised in temperature in a state maintaining the air-fuel ratio of the exhaust gas flowing into the main $SO_x$ trap catalyst lean without allowing it to become rich.

5. An exhaust purification device of an internal combustion engine as set forth in claim 1, wherein when regenerating the main $SO_x$ trap catalyst, the air-fuel ratio of the exhaust gas flowing into the main $SO_x$ trap catalyst is made rich.

6. An exhaust purification device of an internal combustion engine as set forth in claim 1, wherein the main $SO_x$ trap catalyst comprises a serially arranged $SO_x$ trap catalyst and particulate filter.

7. An exhaust purification device of an internal combustion engine as set forth in claim 1, wherein the main $SO_x$ trap catalyst comprises an $NO_x$ storage catalyst.

* * * * *